US010278037B2

(12) United States Patent
Foss et al.

(10) Patent No.: US 10,278,037 B2
(45) Date of Patent: Apr. 30, 2019

(54) CALL SCREENING CONNECTION

(71) Applicants: Aaron Foss, Port Jefferson, NY (US);
Vadim Alexander Gordin, Louisville, KY (US)

(72) Inventors: Aaron Foss, Port Jefferson, NY (US);
Vadim Alexander Gordin, Louisville, KY (US)

(73) Assignee: Telephone Science Corporation, Mt. Sinai, NY (US)

( * ) Notice: Subject to any disclaimer, the term of this patent is extended or adjusted under 35 U.S.C. 154(b) by 0 days.

(21) Appl. No.: 14/996,758

(22) Filed: Jan. 15, 2016

(65) Prior Publication Data
US 2017/0208442 A1    Jul. 20, 2017

(51) Int. Cl.
*H04W 4/16*    (2009.01)
*H04M 3/436*    (2006.01)

(52) U.S. Cl.
CPC ............ *H04W 4/16* (2013.01); *H04M 3/436* (2013.01)

(58) Field of Classification Search
CPC ..... H04W 48/12; H04W 84/12; H04W 48/16; H04W 76/022; H04W 48/18; H04W 12/04; H04W 12/06; H04L 61/1511; H04L 12/5692; H04L 61/2015; H04L 63/06; H04L 63/08; H04L 2463/061
See application file for complete search history.

(56) References Cited

U.S. PATENT DOCUMENTS

| | | | |
|---|---|---|---|
| 4,278,844 A | 7/1981 | Jones | |
| 5,408,525 A | 4/1995 | Carlson | |
| 5,651,053 A | 7/1997 | Mitchell | |
| 5,655,013 A | 7/1997 | Gainsboro | |
| 5,828,742 A | 10/1998 | Khalid | |
| 5,999,606 A | 12/1999 | Weishut | |
| 6,130,937 A | 10/2000 | Fotta | |
| 6,549,619 B1 | 4/2003 | Bell | |
| 6,859,528 B1 | 2/2005 | Welte | |
| 6,990,187 B2 | 1/2006 | MacNamara | |
| 7,103,167 B2 | 9/2006 | Beahm | |
| 7,233,656 B2 | 6/2007 | Bedingfield | |
| 7,295,660 B1 | 11/2007 | Higginbotham | |
| 7,715,790 B1 | 5/2010 | Kennedy | |
| 7,756,262 B2 | 7/2010 | Caso | |
| 8,165,102 B1* | 4/2012 | Vleugels | H04W 88/08 370/338 |
| 8,346,881 B1 | 1/2013 | Cohen | |
| 2010/0296441 A1* | 11/2010 | Barkan | H04W 12/08 370/328 |
| 2011/0292928 A1* | 12/2011 | Yin | H04M 7/0057 370/352 |
| 2013/0247150 A1* | 9/2013 | Cherian | H04L 63/0815 726/4 |
| 2013/0297754 A1* | 11/2013 | Wentink | H04W 48/18 709/220 |
| 2014/0112325 A1* | 4/2014 | Calcev | H04W 48/16 370/338 |
| 2014/0366105 A1* | 12/2014 | Bradley | H04W 12/08 726/5 |
| 2015/0131608 A1* | 5/2015 | Son | H04W 72/10 370/330 |
| 2017/0079078 A1* | 3/2017 | Wang | H04W 12/06 |

* cited by examiner

*Primary Examiner* — Jung Liu

(74) *Attorney, Agent, or Firm* — Vadim Gordin

(57) ABSTRACT

Methods and Systems are disclosed herein for the streamlined configuration of WIFI devices and particularly credentials for local WIFI networks.

19 Claims, 1 Drawing Sheet

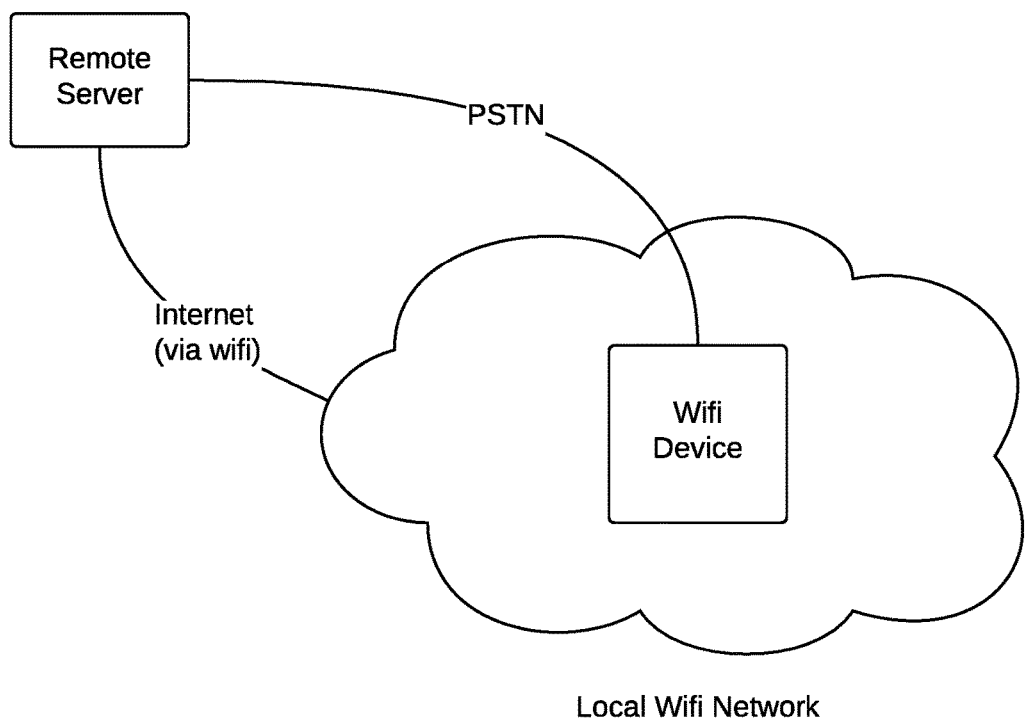

US 10,278,037 B2

CALL SCREENING CONNECTION

CLAIM OF PRIORITY

This is the first filing made with the USPTO by the applicant regarding the present disclosure.

BACKGROUND/FIELD

In the field of wireless networking, access to wireless computer (Wifi) networks is often protected by passcodes. At present, a user who wishes to connect a new device to a Wifi network must enter the passcode via the device's user interface. Novel methods and apparatae are disclosed herein which simplify the process of entering passcodes into Wifi-capable devices.

SUMMARY

According to certain embodiments of the present disclosure, a method of configuring a device includes the steps of; providing a local environment with PSTN access and internet access via a password protected WIFI network, providing a locally disposed device with a wife transceiver and PSTN connectivity, providing a remotely disposed server with internet and PSTN connectivity; connecting the local device to the remote server with a telephone call, identifying configuration parameters for the local device including the local wife password, transmitting the parameters from the server to the local device over the PSTN such that further communication can occur over the local password protected WIFI.

According to further embodiments of the present disclosure, the configuration parameters are previously entered into the server by a user via a third internet connected device including for instance a web browser on a personal computer.

According to further embodiments of the present disclosure, a portion of the call includes voice communication between the user speaking through a telephone headset connected in parallel with the local device to an operator connected at the server's telephone number.

According to further embodiments of the present disclosure, the call to the server is initiated by one of, a user interaction with the local device, a user interaction with the server, an automated server event, a predetermined interval, or a failure of other communications means.

According to further embodiments of the present disclosure, the user interaction is selected from at least one of, powering on the local device for the first time, a request for the call via the local device user interface, a request for the call via an internet-connected interface distinct from the server and local device, a manually placed telephone call to the server.

According to further embodiments of the present disclosure, the local device actively listens for configuration parameters when a telephone call is in progress on the PSTN line to which it is connected.

According to further embodiments of the present disclosure, the input used in the identifying step is transmitted by the local device and selected from one of, a local device serial number, user credentials, or a unique user identifier.

According to further embodiments of the present disclosure, the identifying step is determined by caller ID data for the local device.

According to further embodiments of the present disclosure, the parameters are encoded using on of DTMF tones, FSK encoding, or MODEM encoding.

According to certain embodiments of the present disclosure, a remotely configurable system for entering local wifi credentials includes; a locally device having a wifi transceiver and PSTN connectivity disposed within a local environment having PSTN access and internet access via a password protected WIFI network, a remotely disposed server with internet and PSTN connectivity; wherein upon establishing a PSTN connection between the local device and the remote server, the server identifies configuration parameters for the local device including the local wifi password and transmits those parameters to the local device over the PSTN.

According to further embodiments of the present disclosure, the configuration parameters are previously entered into the server by a user via a third internet connected device including for instance a web browser on a personal computer.

According to further embodiments of the present disclosure, a portion of the call includes voice communication between the user speaking through a telephone headset connected in parallel with the local device to an operator connected at the server's telephone number.

According to further embodiments of the present disclosure, the call to the server is initiated by one of, a user interaction with the local device, a user interaction with the server, an automated server event, a predetermined interval, or a failure of other communications means.

According to further embodiments of the present disclosure, the user interaction is selected from at least one of, powering on the local device for the first time, a request for the call via the local device user interface, a request for the call via an internet-connected interface distinct from the server and local device, a manually placed telephone call to the server.

According to further embodiments of the present disclosure, the local device actively listens for configuration parameters when a telephone call is in progress on the PSTN line to which it is connected.

According to further embodiments of the present disclosure, the input used in the identifying step is transmitted by the local device and selected from one of, a local device serial number, user credentials, or a unique user identifier.

According to further embodiments of the present disclosure, the identifying step is determined by caller ID data for the local device.

According to further embodiments of the present disclosure, the parameters are encoded using on of DTMF tones, FSK encoding, or MODEM encoding.

According to certain embodiments of the present disclosure, a remotely configurable system for entering local wifi credentials includes; a locally device having a wifi transceiver and PSTN connectivity disposed within a local environment having PSTN access and internet access via a password protected WIFI network, a remotely disposed server with internet and PSTN connectivity; wherein upon establishing a PSTN connection between the local device and the remote server in response to a user interaction with the local device, a user interaction with the server, an automated server event, a predetermined interval, or a failure of other communications means, the server identifies configuration parameters for the local device including the local wifi password and transmits those parameters to the local device over the PSTN.

BRIEF DESCRIPTION OF THE FIGURES

In the FIGURES, which are not necessarily drawn to scale, like numerals describe substantially similar components throughout the several views. The drawings illustrate generally, by way of example, but not by way of limitation, various embodiments discussed in the claims of the present document.

FIG. 1 shows a block diagram of a system as described in the present disclosure.

DETAILED DESCRIPTION OF THE FIGURES

Various embodiments of the presently disclosed apparatus will now be described in detail with reference to the drawings, wherein like reference numerals identify similar or identical elements.

Referring now to FIG. 1, a WIFI device is disposed within range of a password protected WIFI network. In order for the device to connect to the network, the password for that network must be entered into the device. The device in this exemplary case is capable of communication via both publically switched telephone networks (PSTN) and WIFI. The device is connected to the PSTN and within range of an internet-connected WIFI network. There is a remote server disposed at a different location which is capable of communicating via both PSTN and the internet.

Initially a user stores the passcode for the local wifi network within the remote server. The user may accomplish this via a web page in communication with the server, or by dictating the password to a human or machine operator who in turn enters the WIFI password into the server. The stored password is paired with account identifying account information for the user, including for instance the user's home phone number, the name of the user's local wifi network, the serial number of the WIFI device that they own, or other suitable identifying information. Next, when the user desires to connect the WIFI device to the local WIFI network, the WIFI device initiates a telephone call via the PSTN to the remote server thereby creating a data link between the WIFI device and the remote server.

In a first exemplary scenario, where identification occurs using caller ID data, the server recognizes the origin number for the call placed by the WIFI device and associates the call with the proper WIFI password record. Next, the server transmits the local WIFI password to the WIFI device over the PSTN. When transmitted, the WIFI password may be encoded using modulation, FSK, DTMF, or other data encoding methods known in the arts for use with PSTNs. The WIFI device then connects to the local WIFI network using the provided password and verifies this connection to the remote server before disconnecting the telephone call.

In a second exemplary scenario, the user connects the WIFI device to his telephone jack and initiates a telephone call to the remote server using either an interface on the WIFI device or a separate telephone handset. Once a telephone connection is established, an operator at the remote server speaks with the user to collect their wifi password, as well as other optional information including for instance billing information, account preferences, and the like. Once all of the relevant data is collected, the operator initiates transmission of the data and WIFI password to the WIFI device over the PSTN line. Once the operator and user have confirmation that the wifi device has been successfully connected to the local WIFI network, the call is disconnected.

In a third exemplary embodiment, a user purchases the WIFI device via a website. When completing the order on the website, the user enters the WIFI password and local telephone number where the WIFI device will be used. This information is stored within the Remote Server. A WIFI device is mailed to the user. When the WIFI device is received by the user, connected to a PSTN, and powered on, the device automatically establishes a telephone connection with the Remote Server. The remote server recognizes the origin telephone number and transmits the WIFI password to the WIFI device.

In a fourth exemplary embodiment, a user purchases the WIFI device via a website. When completing the order on the website, the user enters the WIFI password. This information is stored within the Remote Server and paired with the serial number for the specific WIFI device which is mailed to the user. When the WIFI device received by the user, connected to a PSTN, and powered on, the device automatically establishes a telephone connection with the Remote Server. The remote server recognizes the serial number and transmits the WIFI password to the WIFI device.

The preceding description is a non-limiting and purely exemplary method of implementing the claims which are appended below.

What is claimed is:

1. A method of configuring a first device with configuration parameters, the method comprising; providing a first location within a building with PSTN access and public internet access via a local password protected WIFI network, providing the first device within the first location, with the first device having a wifi transceiver and PSTN connectivity, providing a remote server disposed at a second location away from the building with the server having at least public internet and PSTN connectivity and only PSTN and public internet connectivity between the first and second locations; connecting the first device to the remote server with a telephone call over PSTN, identifying configuration parameters for the first device including the local wifi credentials, transmitting the parameters from the server to the local device over the PSTN such that the first device can access the password protected WIFI at the first location for further communication.

2. The method of claim 1; wherein the configuration parameters are previously entered into the server by a user via a third internet connected device including for instance a web browser on a personal computer.

3. The method of claim 1; wherein a portion of the call includes voice communication between the user speaking through a telephone headset connected in parallel with the first device to an operator connected at the server's telephone number.

4. The method of claim 1, wherein the call to the server is initiated by one of, a user interaction with the first device, a user interaction with the server, an automated server event, a predetermined interval, or a failure of other communications means.

5. The method of claim 4, wherein the user interaction is selected from at least one of, powering on the first device for the first time, a request for the call via the first device user interface, a request for the call via an internet-connected interface distinct from the server and local device, a manually placed telephone call to the server.

6. The method of claim 4, wherein the first device actively listens for configuration parameters when a telephone call is in progress on the PSTN line to which it is connected.

7. The method of claim 1, wherein the input used in the identifying step is transmitted by the first device and selected from one of, a local device serial number, user credentials, or a unique user identifier.

8. The method of claim 1, wherein the identifying step is determined by caller ID data for the first device.

9. The method of claim 1, wherein the parameters are encoded using on of DTMF tones, FSK encoding, or MODEM encoding.

10. A remotely configurable system for entering wifi credentials; the system comprising; a communications device having a wifi transceiver and PSTN connectivity disposed within a first location having PSTN access and public internet access via a password protected WIFI network, a remote server disposed in a second location with public internet and PSTN connectivity and no dedicated connection to the first location; wherein upon establishing a PSTN connection between the local device and the remote server, the server identifies configuration parameters for the local device including the local wifi password and transmits those parameters to the local device over the PSTN.

11. The system of claim 10; wherein the configuration parameters are previously entered into the server by a user via a third internet connected device including for instance a web browser on a personal computer.

12. The system of claim 10; wherein a portion of the call includes voice communication between the user speaking through a telephone headset connected in parallel with the first device to an operator connected at the server's telephone number.

13. The system of claim 10, wherein the call to the server is initiated by one of, a user interaction with the local device, a user interaction with the server, an automated server event, a predetermined interval, or a failure of other communications means.

14. The system of claim 10, wherein the user interaction is selected from at least one of, powering on the local device for the first time, a request for the call via the local device user interface, a request for the call via an internet-connected interface distinct from the server and local device, a manually placed telephone call to the server.

15. The system of claim 10, wherein the local device actively listens for configuration parameters when a telephone call is in progress on the PSTN line to which it is connected.

16. The system of claim 10, wherein the input used in the identifying step is transmitted by the first device and selected from one of, a local device serial number, user credentials, or a unique user identifier.

17. The system of claim 10, wherein the identifying step is determined by caller ID data for the first device.

18. The system of claim 10, wherein the parameters are encoded using on of DTMF tones, FSK encoding, or MODEM encoding.

19. A remotely configurable system for entering local wifi credentials; the system comprising; a first device having a wifi transceiver and PSTN connectivity disposed within a first, "local" environment having PSTN access and internet access via a password protected WIFI network, a server disposed in a "remote" location with internet and PSTN connectivity; wherein the only connectivity between the local and remote locations is via PSTN and internet; wherein upon establishing a PSTN connection between the first device and the remote server in response to one of, a user interaction with the first device, a user interaction with the server, an automated server event, a predetermined interval, or a failure of other communications means, the server identifies wifi credentials for the local environment and transmits those credentials to the first device over the PSTN.

* * * * *